United States Patent
Harris et al.

[11] Patent Number: 5,977,348
[45] Date of Patent: Nov. 2, 1999

[54] POLYSACCHARIDE MODIFICATION IN DENSIFIED FLUID

[75] Inventors: Rosemarie Harris, Yonkers, N.Y.; Sharon H. Jureller, Haworth, N.J.; Judith L. Kerschner, Fair Lawn, N.J.; Peter T. Trzasko, Plainsboro, N.J.; Robert W. R. Humphreys, Annandale, N.J.

[73] Assignee: National Starch and Chemical Investment Holding Corporation, Wilmington, Del.

[21] Appl. No.: 08/900,753

[22] Filed: Jul. 25, 1997

[51] Int. Cl.$^6$ ............ C08B 31/04; C08B 31/10; C08B 37/00
[52] U.S. Cl. ............ 536/107; 536/58; 536/84; 536/69; 536/111; 536/123.1; 536/123.12; 536/124
[58] Field of Search ............ 536/123.1, 124, 536/56, 102, 103, 112, 114, 58, 69, 107, 110, 111, 123, 123.12, 84

[56] References Cited

U.S. PATENT DOCUMENTS

| | | |
|---|---|---|
| 2,461,139 | 2/1949 | Caldwell ............ 260/234 |
| 3,839,320 | 10/1974 | Bauer ............ 260/233.5 |
| 4,598,006 | 7/1986 | Sand ............ 424/81 |
| 4,820,752 | 4/1989 | Berens et al. ............ 523/340 |
| 4,990,601 | 2/1991 | Skjak-Braek et al. ............ 536/3 |
| 5,321,132 | 6/1994 | Billmers ............ 536/48 |
| 5,578,088 | 11/1996 | Schrell et al. ............ 8/475 |
| 5,667,691 | 9/1997 | Ghatta et al. ............ 210/634 |

FOREIGN PATENT DOCUMENTS 02103202   4/1990   Japan ............ C08B 11/02

OTHER PUBLICATIONS

A. R. Berens, Gary S. Huvard, Richard W. Korsmeyer, F. W. Kunig, Application of Compressed Carbon Dioxide in the Incorporation of Additives into Polymers, The BF Goodrich Company, Research & Development Center, Brecksville, Ohio, pp. 231–242, 1988.

Manssur Yalpani, "Supercritical fluids: puissant media for the modification of polymers and biopolymers", Polymer 1993 vol. 34, No. 5, pp. 1102–1105, 1992.

Manssur Yalpani, "New Approaches to the Synthesis of Glycan Derivatives", Carbohydrates and Carbohydrate Polymers, Analysis, Biotechnology, Modification, Antiviral, Biomedical and Other Applications, Yalpani, M. (ed.), ©ATL Press, 1993.

Hyun–Song Lee, Woo Gi Lee, Sang–Woo Park, Huen Lee and Ho Nam Chang, "Starch Hydrolysis Using Enzyme in Supercritical Carbon Dioxide", Biotechnology Techniques, vol. 7 No. 4 (Apr. 1993) pp. 267–270.

*Primary Examiner*—Howard C. Lee
*Attorney, Agent, or Firm*—Karen G. Kaiser

[57] ABSTRACT

This invention relates to a process for chemically modifying polysaccharides in a densified fluid. In particular, the modification includes esterification and/or etherification of a starch in supercritical carbon dioxide. The process is advantageous in that it allows for a high degree of substitution without the use of organic solvents or repeated reactions.

29 Claims, 1 Drawing Sheet

POLYSACCHARIDE MODIFICATION IN DENSIFIED FLUID

FIELD OF THE INVENTION

This invention relates to the chemical modification of polysaccharides in densified fluid.

BACKGROUND OF THE INVENTION

The modification of polysaccharides by chemical derivatization is well known in the art. Suitable derivatives include esters, such as acetate, and half esters, such as the succinate and octenyl succinate, prepared by reaction with acetic anhydride, succinic anhydride, and octenyl succinic anhydride, respectively; ethers such as hydroxypropyl ether, prepared by reaction with propylene oxide; phosphate derivatives prepared by reaction with sodium or potassium orthophosphate or sodium or potassium tripolyphosphate; or any other starch derivatives or combinations thereof known in the art.

Techniques used in preparing polysaccharide esters have generally involved aqueous reactions for low degree of substitution esters and non-aqueous systems such as anhydrous pyridine for the high degree of substitution starch esters. Degree of substitution (DS), as used herein, is a measure of the average number of hydroxyl groups on each D-glucopyranosyl unit which are derivatized by substituent groups. Since the majority of D-glucopyranosyl units in starch have three hydroxyl groups available for substitution, the maximum possible DS for starch is 3.0.

A good review of the preparation of starch esters may be found in *Starch: Chemistry and Technology*, $2^{nd}$ Edition, Ed. Whistler, BeMiller, and Paschall, Academic Press, 1984, Chapter X. This reference teaches that low degree of substitution starch acetates can be made by the treatment of an aqueous starch suspension with acetic anhydride at pH 7–11. The maximum degree of substitution obtainable without gelatinization varies with the particular starch, but the upper limit is about 0.5 DS. To reach this DS of 0.5, it is necessary to increase repeatedly the reagent concentrations by filtering the starch from the reaction mixture, resuspending it in 1.25–1.5 parts of water per part of starch, and continuing the acetylation.

*Methods in Carbohydrate Chemistry*, Vol. IV, Ed. Whistler, Academic Press, 1964, 286–287, discloses that no more than 10.2 g (0.1 mole) of acetic anhydride for 162 g (1.0 mole) of starch, dry basis, should be used when reacting an aqueous slurry of starch with acetic anhydride because the efficiency of the reaction decreases with dilution. If a higher treatment is needed, the dilution effect can be offset by removing the excess water through filtration followed by resuspension of the starch in water. The treatment can be repeated using a second portion of acetic anhydride. Treatment with 0.1 mole of acetic anhydride yields a starch acetate with a DS of about 0.07. By repeated treatment, it is possible to make a starch acetate having a DS of 0.5. For higher degrees of substitution, pyridine is the preferred catalyst/solvent in the non-aqueous acetylation.

Several methods of preparing polysaccharide esters in aqueous systems are known in the art. U.S. Pat. No. 2,461,139 issued Feb. 8, 1949 to Caldwell discloses the reaction of starch with organic acid anhydrides in an aqueous alkaline medium preferably using 0.1 to 5% organic acid anhydride based on the dry starch with quantities higher than 10% being less desirable. The preparation of low DS starch esters in water using magnesium oxide or magnesium hydroxide to control pH is disclosed in U.S. Pat. No. 3,839,320 issued Oct. 1, 1974 to Bauer.

Accordingly, while it is known to prepare starch esters using aqueous systems as described above, such methods have been limited to the preparation of low DS derivatives and even require multiple or repeated treatments because of difficulties that result when using higher amounts of anhydride and alkaline reagents.

Billmers, et al., U.S. Pat. No. 5,321,132, disclose a method of preparing starch esters having an intermediate DS of about 0.5 to 1.8 by using a one step aqueous process with organic acid anhydrides, by reacting starch with high treatment levels of anhydride and high concentrations of alkaline reagent. The anhydride is added over a period of time and the pH is controlled by the addition of alkali during the reaction.

The presence of organic solvent is a disadvantage in the preparation of modified starches. Removal of this solvent requires time and energy and is therefore generally less preferred commercially. Simply leaving the solvent in the dispersion is often unacceptable as an object of preparing starches may be to eliminate organic solvent at the point of product use. Further, reduction of organic solvents is an aim of many businesses from an environmental standpoint.

Wurzberg also discloses the well known reaction of reacting succinic anhydrides with polysaccharides to form the half ester. Such reaction may be carried out in pyridine or, to obtain a high degree of substitution, in glacial acetic acid. There is a limit, however, as to how much succinic ahydride can be reacted with granular starch because at above a 3% treatment level, which results in about a 0.02 DS, the granules swell to such a degree that filtration becomes difficult.

Polysaccharides may also be reacted with substituted cyclic dicarboxylic acid anhydrides of the formula:

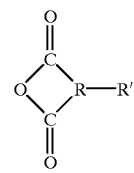

wherein R represents a dimethyl or trimethyl radical and R' is the substituent group, generally a long hydrocarbon chain. The most important commercial products of this class are the alkenylsuccinnate substituted starches. This reaction is more fully disclosed in U.S. Pat. No. 2,661,349 issued to Caldwell and Wurzburg on Dec. 1, 1953 and U.S. Pat. No. 2,613,206 issued to Caldwell on Oct. 7, 1952.

Techniques for starch phosphoration, by reaction with sodium or potassium orthophosphate or sodium or potassium tripolyphosphate, are well known in the art and described, for example, in *Methods in Carbohydrate Chemistry*, pp. 294–295. Reaction with sodium tripolyphosphate gives substantially undegraded starch phosphates of a low DS (about 0.02) and with orthophosphate salts gives starch phosphates at a maximum DS of 0.2. Further, pH must be strictly controlled as severe hydrolysis occurs at pH levels below 5.0 and the reaction is inefficient at pH levels above 6.5.

Techniques for etherification of polysaccharides are also well known in the art, particularly the commercially important hydroxypropyl ether prepared by reaction with propylene oxide. A good review of the preparation of starch ethers may also be found in *Starch: Chemistry and Technology*, Chapter X or *Modified Starches: Properties and Uses*, Ed. Wurzburg, CRC Press, 1986, Chapters 5 and 6.

The most common method of preparing hydroxyalkyl starch derivatives is by reaction with alkylene oxide under strongly alkaline, aqueous conditions. High alkalinity is necessary for good reaction efficiency. However, it is recommended that such reaction be conducted in a closed vessel under a blanket of nitrogen because of the explosibility of alkylene oxide-air mixtures. A further disadvantage of this process is that salts need to be added to repress swelling and at a DS greater than 0.1, the product becomes difficult to purify.

Granular hydroxyalkyl starch ethers with a DS in the range of 0.75 to 1.0 can be prepared by suspending the alkaline starch in organic solvents such as lower aliphatic alcohols or ketones or higher alcohols. However, the presence of organic solvent is disadvantageous as removal of the solvent requires time and energy and is therefore generally less preferred commercially.

A third method of preparing hydroxyalkyl starch derivatives are the so-called "dry" reactions in which starch is reacted with alkylene oxide under pressure in the presence of a suitable catalyst. Starch moisture levels must be kept above 5% for efficiency and a DS of up to 3.0 may be achieved.

Other polysaccharide modifications known in the art include acid hydrolysis, oxidation, and cross-linking.

Densified, particularly supercritical, fluids offer a desirable alternative to both solvent and aqueous based synthetic methods. Densified fluids, as used herein, refers to fluids which have a density of greater than 0.0001 g/mL at one atmosphere and 0° C. Densified carbon dioxide is of particular interest in that it provides a non-toxic, nonflammable, inexpensive, recyclable and environmentally acceptable solvent.

Carbon dioxide is known to accelerate the absorption of additives into polymers and thus has been used to assist polymer impregnation. Berens, et al., "*Application of Compressed Carbon Dioxide in the Incorporation of Additives into Polymers,* AIChE Annual Meeting, Washington, D.C. (Nov. 28–Dec. 2, 1988) disclose that the high solubility, diffusivity, and plasticizing action of carbon dioxide makes compressed carbon dioxide useful as a temporary plasticizer to facilitate the absorption of additives into glassy polymers, specifically poly(vinyl chloride), polycarbonate, poly (methyl methacrylate), and poly(vinyl acetate) Sand, U.S. Pat. No. 4,598,006 and Berens, et al., U.S. Pat. No. 4,820, 752 disclose impregnating a polymer with an additive under pressure, i.e., at or near supercritical conditions.

Chemical modification of polysaccharides in densified liquids has been limited up to this point. Yalpani, in Carbohydrates and Carbohydrate Polymers, *Analysis, Biotechnology, Modification, Antiviral, Biomedical and Other Applications,* Yalpani, M. (ed.), ATL Press, 1993, Ch. 23, and Yalpani, "*Supercritical Fluids: Puissant Media for the Modification of Polymers and Biopolymers,*" Polymer vol. 34 (1993) pp. 1102–1105 disclose modification of glycans, such as chitosan, by reaction with glucose or malto-oligosaccharides in an aqueous/supercritical carbon dioxide mixture to produce water soluble, imine-linked branched chitosan derivatives. The water facilitates this reductive alkylation of the imine functions of the chitosan by the carbohydrates which can produce materials of up to 0.8 DS.

Enzymatic hydrolysis of starch to glucose in supercritical carbon dioxide has also been investigated by Lee, et al. See "*Starch Hydrolysis Using Enzyme in Supercritical Carbon Dioxide,*" Biotechnology Techniques, vol. 7, no. 4 (April 1993) pp. 267–270. In this reaction, the enzyme is necessary for the hydrolysis reaction to proceed.

However, the problem of carrying out efficient chemical modifications of polysaccharides in reactions conducted in densified fluids has remained largely unaddressed until the present invention.

SUMMARY OF THE INVENTION

This invention relates to a process for chemically modifying a polysaccharide in a densified fluid, particularly the addition of at least one substituent, more particularly esterification and/or etherification of a starch in supercritical carbon dioxide. The process is advantageous in that it allows for a high degree of substitution without the use of traditional organic solvents or repeated reactions.

An object of this invention is to modify chemically a polysaccharide in a densified fluid.

Another object of this invention is to esterify and/or etherify a polysaccharide in a densified fluid.

Still another object of this invention is to esterify and/or etherify a polysaccharide in supercritical carbon dioxide.

Yet another object of this invention is to modify chemically a starch or gum in a densified fluid.

A further object of this invention is to esterify and/or etherify a starch in supercritical carbon dioxide.

Yet a further object of this invention is to esterify and/or etherify a starch to a high degree of substitution in supercritical carbon dioxide.

These and other objects of the present invention will become apparent to one skilled in the art from the following detailed description and examples below.

DETAILED DESCRIPTION OF THE INVENTION

Figure 1:
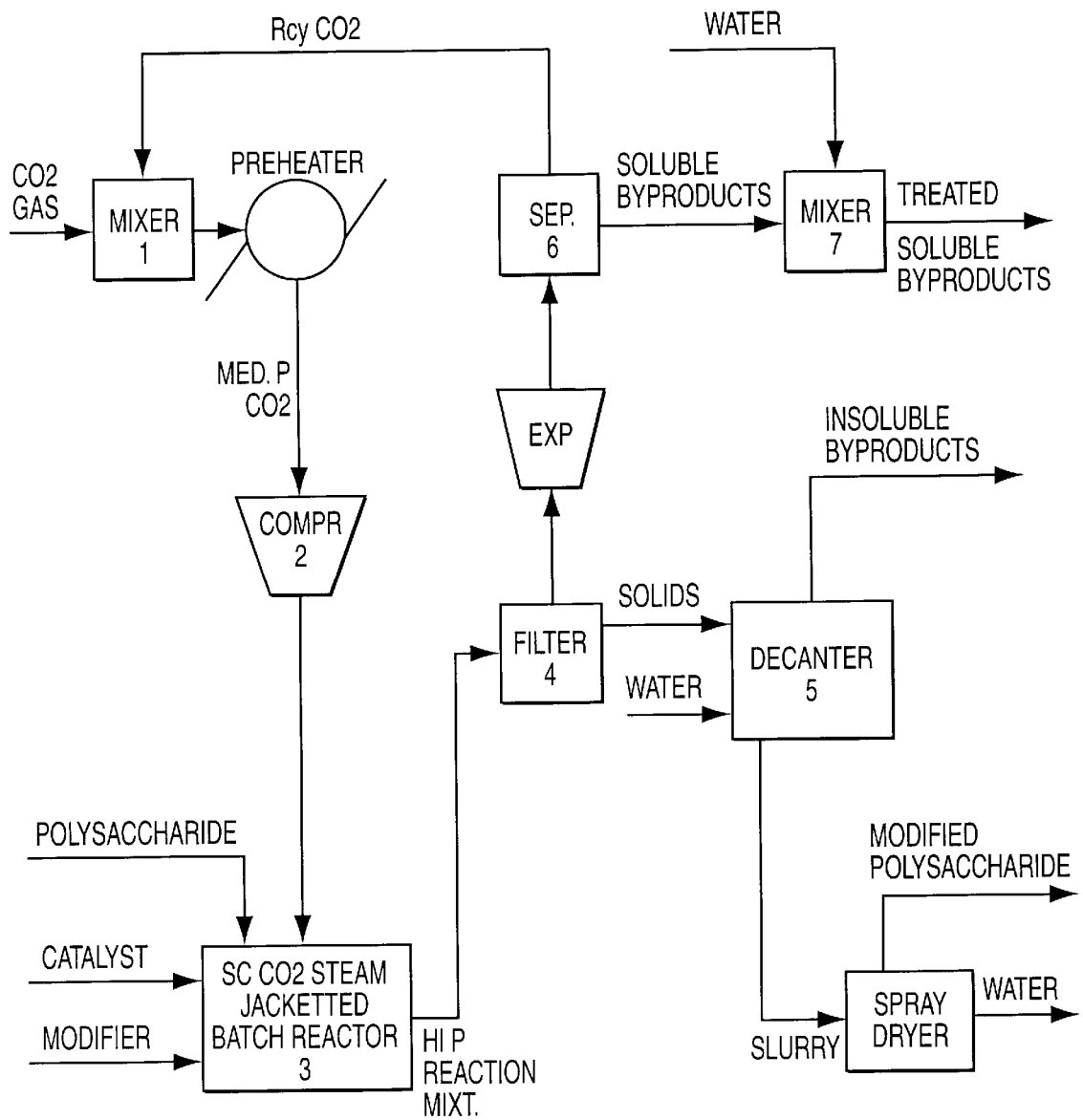
FIG. 1 is a diagrammatic flow chart of the invention using densified carbon dioxide.

This invention relates to a process for chemically modifying at least one polysaccharide in a densified fluid, particularly the addition of at least one substituent, more particularly esterification and/or etherification of a starch in supercritical carbon dioxide. The process is advantageous in that it allows for a high degree of substitution without the use of organic solvents or repeated reactions. Further, many of the reactions may be conducted with reduced byproducts or waste.

Suitable polysaccharide base materials which may be treated in accordance with the present invention include, but are not limited to, starches, gums, celluloses, dextrins, glycogen, hemicelluloses, dextrans, and inulins.

Suitable gum bases which may be treated in accordance with the present invention include agar, arabic gum, karaya gum, tragacanth gum, pectin, carrageenan, alginates, tamarind seed gum, xanthan gum, konjac gum, guar gum, gum accacia, and locust bean (or carob seed) gum, particularly guar gum.

The applicable starch base materials which may be treated in accordance with the present invention may be derived from any starch source including cereals, tubers, roots, legumes, and fruit starches and hybrid starches. Suitable native starches include corn, tapioca, potato, sweet potato, rice, wheat, arrowroot, pea, sorghum, canna and sago, the waxy varieties thereof and the high amylose varieties thereof. As used herein, waxy starches refer to those starches which contain substantially no amylose and high amylose starches refer to those starches which contain at least 45% amylose. Of particular use in the present invention are high amylose corn starches, corn starch, waxy maize starch, and potato starch. Applicable starches include not only native starches, but also converted or derivatized starches.

It is well known that starch is composed of two fractions: amylose, an essentially linear polymer of (1→4) α-D-glucopyranose units; and amylopectin, a branched polymer of shorter chains of (1→4) α-D-glucopyranose units with (1→6) α-branches. Starches from different sources, e.g., potato, corn, tapioca, and rice, are characterized by different relative proportions of the amylose and amylopectin components. Some plant species have been developed which are characterized by a large preponderance of one fraction over the other. For instance, certain varieties of corn, which normally contain about 22–28% amylose, have been developed which yield starch composed of over 45% amylose. High amylose corn hybrids were developed in order to provide starches of high amylose content naturally and have been available commercially since about 1963.

A suitable starting material in the present invention is high amylose corn starch, more particularly that which contains at least 65% amylose by weight. While high amylose corn starch is suitable, other starches which are useful include those derived from any plant species which produces or can be made to produce a high amylose content starch, e.g., potato, pea, barley and rice. Additionally, high amylose starch can be obtained by separation or isolation, such as by the fractionation of a native starch material, or by blending isolated amylose with a native starch.

Also included are the conversion products derived from any of the former bases, for example dextrins prepared by hydrolytic action or acid and/or heat, including British gums; fluidity or thin boiling starches prepared by treatment with oxidants such as sodium hypochlorite; and derivatized starches, such as starch ethers and esters, cationic, anionic, amphoteric, non-ionic, and crosslinked starches which still retain reactive sites. Starch flours may also be used.

The polysaccharide used in this invention may be unmodified or modified and the term polysaccharide is used herein to include both types. By modified polysaccharide it is meant that the polysaccharide can be derivatized or modified by typical processes known in the art, e.g., esterification, etherification, oxidation, acid hydrolysis, cross-linking and/or enzyme conversion. Typically, modified polysaccharides include esters such as the acetate and the half-esters of dicarboxylic acids, particularly the alkenylsuccinic acids; ethers, such as hydroxyethyl and hydroxypropyl starches and starches reacted with hydrophobic cationic epoxides; starches oxidized with hypochlorite; starches reacted with cross-linking agents such as phosphorous oxychloride, epichlorohydrin or phosphate derivatives prepared by reaction with sodium or potassium orthophosphate or tripolyphosphate and combinations thereof. These and other conventional modifications of starch are described in publications such as *Starch: Chemistry and Technology*.

The starch material may comprise a granular or dispersed starch. As used herein, dispersed or non-granular starch means any starch which has had its structure disrupted or removed, i.e., is destructurized, by either thermal (i.e., jet cooking, boiling water bath), mechanical (i.e., drum drying, spray drying, extrusion, shearing) or chemical (i.e., use of liquid ammonia, dextrinization including in the presence of lower alcohol, subject to high levels of caustic) means. The starch material may also include gelatinized or cold water soluble starches. One advantage of using the present modification processes over traditional processes known in the art is that granular starches remain intact at relatively high temperatures. Thus, the processes may be run at higher temperatures than can traditional modification processes without cooking out the starch.

The use of the term "starch base" is thus seen to include any granular or dispersed amylaceous substance, whether native or chemically or otherwise modified, which, however, still retains free hydroxyl groups capable of entering into the reaction of the invention. The starch base may be a single starch or a combination of starches.

Although any of the above-identified polysaccharides are useful in the present invention, the invention is particularly useful in derivatizing polysaccharides which cannot be easily derivatized using the standard methods known in the art, for example, polysaccharide materials which are water sensitive and/or sensitive to the typically used organic solvents or which are not soluble in such solvents. The present invention thus allows derivatization of polysaccharides which could not be previously derivatized, producing novel derivatized polysaccharide materials, including high DS polysaccharide materials.

An example of this advantage is the derivatization, particularly the esterification of guar gum. Using standard methods known in the art, guar gum could not be efficiently modified as, when solubilized in water or organic solvents, it is too viscous to process in solutions containing above about 1% solids by weight. The present invention allows modification, including esterification, of guar gum in densified fluid.

Further, densified fluids are known to swell amorphous polymers more readily than crystalline polymers and partial swelling of the polymer facilitates the transport of modifying agents throughout the polymers. Thus, highly amorphous polysaccharides, such as high amylose starches and flours are particularly useful in the present invention.

The derivatizing agents which may be used in the present invention include any type of organic etherifying or esterifying reagent which is known to react with starch. For example, the reagent may be an epoxy group such as the monoepoxyalkanes or the monoepoxyalkanes containing other functional groups which are not reactive to starch, e.g., ethylene oxide, propylene oxide, butylene oxide, 1,2-epoxybutene, styrene oxide, dialkylaminopropylene oxide, 1,2-epoxy-3-phenoxypropane, and other monoepoxides containing an oxygen linked to adjacent carbon atoms. Ethylene oxide, propylene oxide and butylene oxide are exemplary compounds useful in etherifying the polysaccharide materials, particularly the starch base materials, with propylene oxide being especially useful.

The reagent in the present invention may also be a reactive monohalogen substituted alkane, alkene or alkyne or reactive monohalogen substituted alkane, alkene or alkyne containing other functional groups which are not reactive to the starch under the conditions employed, e.g., allyl chloride or bromide, benzyl chloride or bromide, sodium monochloroacetate, sodium monochloropropionate, dialkylaminoethylchloride, methyl chloride or bromide and higher homologs, propargyl chloride or bromide, or 1-chloro-2-hydroxypropyl trimethylammonium chloride.

The reagent in the present invention may also be a monohalohydrin such as epichlorohydrin or ethylenechlorohydrin, or activated unsaturated compounds capable of reacting with the hydroxyl groups of a polysaccharide by 1,4 addition, e.g., acrylonitrile, acrylamide, acrylate esters, acrylic acid, or crotonic acid.

The reagent in the present invention may also be one which will result in the production of monostarch sulfate derivatives, e.g., alkyl or dialkyl sulfates such as diethylaminoethyl sulfate, 2-haloalkylsulfonic acids, propane sulfone, divinyl sulfone, and sulfolene. The reagent may also be a methylating agent, such as dimethyl sulfate or diethyl sulfate.

The reagent in the present invention may also include those which will result in the production of phosphate derivatives of polysaccharide, such as sodium tripolyphosphate, sodium dihydrogen phosphate and phosphorous oxychloride. Cross-linking reagents may also be employed which include multifunctional reagents such as epichlorohydrin, phosphorous oxychloride, trimetaphosphates, dicarboxylic anhydrides, propiolate esters such as methyl propiolate, ethyl propiolate, isopropyl propiolate, allyl propiolate, cyclohexyl propiolate, 2-octenyl propiolate and the like, and any reagent capable of producing an acetal cross-linked polysaccharide such as aliphatic monoaldehydes and aliphatic dialdehydes, e.g., acetaldehyde, valeraldehyde, glutaric aldehyde, and methyl glutaric anhydride.

The esterifying reagents which may be used in the present invention include any type of reagent which reacts with the polysaccharide base material to produce ester groups. For example, the reagent may be an organic anhydride such as acetic anhydride, propionic anhydride, octanoic anhydride, crotonic anhydride, hexanoic anhydride, heptanoic anhydride, methyl butyric anhydride, isobutyric anhydride, butyric anhydride, decanoic anhydride, lauric anhydride, linoleic anhydride, oleic anhydride, palmitic anhydride, pentafluoropropionic anhydride, stearic anhydride, trichloroacetic anhydride, naphthalic anhydride, trifluoroacetic anhydride, valeric anhydride, benzoic anhydride, cyclobutanetetracarboxylic dianhydride, cyclohexanedicarboxylic anhydride, norbornene dicarboxylic anhydride, and pyridine carboxylic anhydride.

Esterification as used herein may involve the formation of the half-esters of dicarboxylic acids or anhydrides such as succinic anhydride, octenyl succinic anhydride, and other aliphatic succinic anhydride derivatives, maleic anhydride, phthalic anhydride, dichlorophthalic anhydride, hydroxyphthalic anhydride, homophthalic anhydride, and other aliphatic phthalic anhydride derivatives, glutaric anhydride and other aliphatic and aromatic glutaric anhydride derivatives, itaconic anhydride, or the esters made by transesterification with aliphatic esters of carboxylic acids e.g., methyl and ethyl and other aliphatic or aromatic esters of $C_2$–$C_{30}$ acids such as methyl acetate, ethyl acetate, vinyl acetate, methyl propionate, ethyl propionate, methyl octanoate, ethyl octanoate, methyl decanoate, ethyl decanoate, methyl trifluoroacetate, ethyl trifluoroacetate, methyl laurate, ethyl laurate, methyl oleate, ethyl oleate, methyl stearate, ethyl stearate, methyl benzoate, ethyl benzoate, methyl octenylsuccinate, and ethyl octenylsuccinate and higher homologs.

Other esterifying reagents in the present invention include any acid halide which is known to react with starch base materials. For example, the derivatizing reagent may be any $C_1$–$C_{30}$ acid halide or acid halide containing other functional groups which are not reactive to starch, e.g., acetyl chloride, benzoyl chloride, anisoyl chloride, crotonyl chloride, ethoxybenzoyl chloride, diphenylacetyl chloride, ethyl oxalyl chloride, ethyl malonyl chloride, hexanoyl chloride, lauroyl chloride, oxalyl chloride, octanoyl chloride, palmitoyl chloride, succinyl chloride, terephthaloyl chloride, nitrobenzoyl chloride, toluoyl chloride, stearoyl chloride, trifluorobenzoyl chloride, trifluoroacetyl chloride, trifluoromethylbenzoyl chloride, undecanoyl chloride, valeryl chloride and the like.

The esterifying reagent in the present invention may include any carboxylic acid containing compound that will react with the polysaccharide base materials under acid catalysis conditions to form an ester. For example, the derivatizing reagent may be any carboxylic acid or carboxylic acid containing other functional groups which are not reactive to the polysaccharide. Included are $C_1$–$C_{30}$ carboxylic acid compounds such as acetic acid, acetoacetic acid, aconitic acid, acrylic acid, adipic acid, azelaic acid, benzoic acid and substituted benzoic acids, butyric acid, carboxyphenoxyacetic acid, chloroacetic acid, cinnamic acid, crotonic acid, decanoic acid, dibromoacetic acid, diethylmalonic acid, difluoroacetic acid, diethylsuccinamic acid, dimethylaminobutyric acid, dimethylglutaric acid, diphenylacetic acid, diphenylpropionic acid, docosanoic acid, dimethylmalonic acid, dinitrophenylacetic acid, eicosanoic acid, elaidic acid, erucic acid, ethylhexanoic acid, ethylmalonic acid, fluoroacetic acid, formic acid, fumaric acid, gluconic acid, glutaric acid, glycolic acid, heptanoic acid, hexanoic acid, homophthalic acid, homovanillic acid, indoleacrylic acid, isobutyric acid, itaconic acid, ketomalonic acid, lactic acid, lauric acid, linoleic acid, maleic acid, malic acid, malonic acid, mesaconic acid, methacrylic acid, methoxyacetic acid, methoxyphenylacetic acid, methyladipic acid, methylbutyric acid, methylhexanoic acid, methylmalonic acid, methylpentenoic acid, methylsuccinic acid, mucic acid, myristic acid, myristoleic acid, naphthylacetic acid, nitrodecanoic acid, nitrophenylacetic acid, nonanoic acid, octanoic acid, octenoic acid, oleic acid, oxalic acid, palmitic acid, penicillic acid, pentafluoropropionic acid, phthalic acid and substituted phthalic acids, pentenoic acid, phenylacetic acid, pyruvic acid, phenylmalionic acid, phenylsuccinic acid, pimelic acid, pinoic acid, propionic acid, sebacic acid, stearic acid, succinic acid, tartaric acid, tetracosanoic acid, thallic acetate, tolylacetic acid, tricarballylic acid, tricosanoic acid, tridecanoic acid, trifluoroacetic acid, trimethylacetic acid, triphenylacetic acid, undecanoic acid, undecylenic acid, valeric acid, vinylacetic acid and the like.

Esterification of the polysaccharide base materials in the present invention can also be achieved by reaction with diketene to form polysaccharide acetoacetates and ketene to form acetates.

In addition to esterification and etherification reactions with the polysaccharides, other types of modification can be performed in densified fluid media. The polysaccharide hydroxyl groups may also be reacted with reagents such as isocyanates to form urethanes or carbamates. Polysaccharides may be reacted with bi- or poly-functional reagents such as epichlorohydrin, aliphatic dihalides, sodium trimetaphosphate or phosgene to form cross-linked products which can alter a number of the physical properties of the modified materials such as solubility, viscosity and paste properties. The formation of cationic starches is also possible in densified fluids by reaction of the polysaccharide with reagents such as dialkyl cyanamides or ethyleneimine. An advantage of performing these reactions in the densified fluid versus the traditional aqueous process is that a number of these reagents are water sensitive and would react with the solvent preferentially over the polysaccharide. Densified fluids, such as carbon dioxide, act as organic solvents and therefore are more likely to be inert to the various modification reagents.

Most polysaccharides may also be converted to new materials by acid catalyzed hydrolyses or oxidations. These types of processes may also be performed in densified fluid media, such as carbon dioxide, to form novel polysaccharide products with new physical properties.

Dicarboxylic acid anhydrides of the formula RC(O)OC(O)R wherein R is a $C_{1-30}$alkyl or a $C_{1-30}$alkenyl, alkylene oxides, phosphorous oxychloride and cyclic dicarboxylic acid anhydrides of the formula

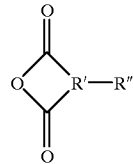

wherein R' is a dimethyl or trimethyl radical and R" is a $C_{1-30}$alkyl or a $C_{1-30}$alkenyl are reagents of particular interest, acetic anhydride, propylene oxide, phosphorous oxychloride, and octenyl succinic anhydride being of more particular interest, in the present modification processes.

The various treatments and modifications as disclosed herein are further described in *Starch: Chemistry and Technology, Methods in Carbohydrate Chemistry,* and *Modified Starches: Properties and Uses.* Other derivatizing reagents and reactions will be obvious to those skilled in the art and they are included in the scope of this invention. Further, a pleurality of derivatizing reagents and/or reactions may be used.

The polysaccharide base material is derivatized in at least one densified fluid. As used herein, densified fluid refers to a fluid which has a density of greater than 0.0001 g/mL at one atmosphere and 0° C.; densified carbon dioxide refers to carbon dioxide that has a density (g/ml) greater than that of carbon dioxide gas at 1 atm and 0° C.; and supercritical carbon dioxide refers to carbon dioxide which is at or above the critical temperature of 31° C. and the critical pressure of 71 atmospheres and which cannot be condensed into a liquid phase despite the addition of further pressure.

Densified and supercritical carbon dioxide are particularly suitable as they are non-polar solvents which are relatively inexpensive, non-toxic, environmentally acceptable and recyclable. Although densified or supercritical carbon dioxide are particularly useful in the inventive synthesis, other densified molecules having supercritical properties may also be employed alone or in mixture. These molecules include methane, ethane, propane, ammonia, butane, n-pentane, n-hexane, cyclohexane, n-heptane, ethylene, propylene, methanol, ethanol, isopropanol, benzene, toluene, p-xylene, sulfur dioxide, chlorotrifluoromethane, trichlorofluoromethane, perfluoropropane, chlorodifluoromethane, sulfur hexafluoride, nitrous oxide, monofluoromethane, isobutanol, krypton and xenon. Other supercritical compounds which may be useful are cited in the CRC Handbook of Chemistry and Physics, 67th ed., 1986–1987 published by CRC Press, Inc. of Boca Raton, Fla.

A catalyst may optionally be added to the reaction to increase the rate of reaction. Suitable catalysts include any of the salts of organic acids such as sodium acetate, potassium acetate, lithium acetate, ammonium acetate, sodium trifluoroacetate, potassium trifluoroacetate, ammonium trifluoroacetate, ammonium perfluoropolyether carboxylates such as the ammonium salt of the carboxylic acid perfluoropolyether (commercially available from DuPont under the tradename Krytox™), including hydrates of these salts. Other base catalysts include metal hydroxides such as sodium hydroxide, potassium hydroxide, lithium hydroxide, and organic tertiary amines such as triethylamine, dimethylaminopyridine, dimethylaniline, di-2-pyridylketone, di-2-pryidyl, 2-dimethylaminopyridine, 5-dimethylamino-2-pentanone, N,N-dimethylnitrosoaniline, dimethylaminoacetonitrile, dimethyloctylamine, and the like. Also included as catalysts are acids such as p-toluenesulfonic acid, methanesulfonic acid, boric acid, sulfuric acid, hydrochloric acid, phosphoric acid, Bronsted acids, and Lewis acids such as dibutyltindilaurate, iron(III) chloride, scandium(III)trifluoromethanesulfonic acid, boron trifluoride, tin(IV)chloride, and Lewis acids of the type $MX_n$ where X is a halogen atom or an inorganic radical, such as $BX_3$, $AlX_3$, $FeX_3$, $GaX_3$, $SbX_3$, $SnX_4$, $AsX_5$, $ZnX_2$, $HgX_2$ and bases such as Lewis bases.

Organic acids, ammonium perfluoropolyether carboxylates, metal hydroxides, organic tertiary amines, Lewis bases, Lewis acids, and Bronsted acids are of particular interest in the present modification processes. Other catalysts which may be used in the present invention will be obvious to those skilled in the art and they are included in the scope of this invention.

A limited amount of a solvent entrainer may optionally be added to the reaction mixture to aid in solubilization of the reagents and/or catalysts. The amount of solvent entrainer may be up to about 15%, particularly up to about 10%, more particularly up to about 5%, by volume. Solvent entrainers include, but are not limited to, water and organic solvents such as acetone, glycols, acetonitriles, $C_{1-10}$alcohols, and $C_{5-15}$hydrocarbons. When water is used as a solvent entrainer, the amount is limited as water outside this range may stop the reaction, particularly when a reagent is used which reacts with water such as an anhydride or acid chloride.

The polysaccharide of the present invention may be derivatized to any desired degree. Thus, although the ability to synthesize high DS polysaccharides is one advantage of the present invention, the present process may also be used to synthesize low DS polysaccharides. The degree of substitution will determine the properties of the polysaccharides along with the base polysaccharide chosen, the method of preparation/derivatization, and the type and amount of substituents added. The temperature and pressure under which the present reaction progresses are also primary factors in controlling the degree of substitution of the resultant polysaccharide. These properties and the methods of achieving them are known in the art and detailed in numerous references, including for example *Modified Starches: Properties and Uses.*

One advantage of using many of the reactions of this process is that they may be conducted with reduced byproducts or waste for a number of reasons. Standard aqueous starch modification reactions have large aqueous waste streams which contain unreacted reagents, byproducts and catalysts that have to be properly disposed. The densified fluid system, in particular that using carbon dioxide, minimizes the waste stream because the densified fluid can be easily recycled and used continuously in the process. Also the soluble unreacted reagents, byproducts and catalysts can be recovered from the densified fluid after separation from the starch and optionally disposed of or treated to form useful products.

Another advantage of this modification process using densified fluids as the solvent medium, is that the fluid soluble unreacted reagents and byproducts can be easily separated from the modified polysaccharide, since the polysaccharide is insoluble in the fluid. At the end of the synthesis process, the components of the high pressure reaction mixture may be passed through a filter to remove the solid components which included the granular modified polysaccharide and washed with excess densified fluid to remove any excess soluble byproducts. The solids may optionally be washed with water to remove any water soluble, but densified fluid insoluble byproducts and the aqueous slurry of modified polysaccharide is then dried optionally in a spray dryer.

The derivatized polysaccharides of the instant invention may be useful in numerous applications, dependent upon their properties, including food and industrial applications such as textiles, paper, and adhesives. These applications are known in the art and include, but are not limited to, films, adhesives, binders, thickener stabilizing agents, texturizing agents, colloids, viscosifiers or thickeners, gelling agents, stabilizers, warp sizing agents, surface sizing agents, glass-forming sizing agents, pregelatinized starches, coating agents, paper strengtheners, pasting agents, yarn sizing agents, pastes, textile furnishing agents, freeze-thaw stabilizers, plasma extenders, emulsifiers, encapsulating agents, wet-end additives, stiffeners, hydrophobic powder bases, pigment or water retention agents, sedimentation aids, flocculants, scale controllers, emulsion stabilizers, disintigrants, opacifying agents, lubricating agents, flow additives, anti-sticking agents, anti-caking agents, and textile finishers.

The invention relates to a process for chemically modifying a polysaccharide comprising the steps of:
 a) selecting at least one polysaccharide;
 b) selecting at least one reagent; and
 c) combining the polysaccharide and the reagent under densified fluid conditions using densified fluid for a time effective to result in a chemically modified polysaccharide.

The conditions to be used for the synthesis according to the invention should be chosen according to the reactive groups and densified compounds used. In general, the temperature ranges from about 0° C. to 300° C., particularly from about 25° C. to 200° C.; the pressure is elevated and ranges from about 14.7 to 10,000, more particularly from about 500 to 5000, psi; and the time period for the synthesis reaction ranges for a time of from about 5 minutes to 48 hours, particularly from about 30 minutes to 24 hours. The temperature and pressure under which the present reaction progresses are of particular importance as they are primary factors in controlling the degree of substitution of the resultant polysaccharide. In general, the higher the reaction temperature or the lower the reaction pressure, the higher the DS achieved using the same or even a lower amount of catalyst.

A typical synthesis process using densified fluid conditions is diagramatically represented in FIG. 1. A main vessel receives the reaction components, the polysaccharide and reagent as well as any catalyst and/or solvent entrainers. The main vessel may also be referred to as a steam jacketed batch reactor (3) or autoclave, particularly as described in the examples.

The densified fluid is introduced into the jacketed batch reactor (3) from the fluid storage tanks. Much of the densified fluid is recycled within the system so that any losses during the synthesis process are made up from these fluid storage tanks and the recycled and added fluid is mixed in the mixer (1). This densified fluid is passed through a preheater which heats the fluid to a range of 0° C. to 300° C. This heated fluid is then pumped into the batch reactor by the compressor (2) at pressures ranging between 14.7 and 10,000 psi. The fluid in the batch reactor (3) is maintained in a range from about 0° C. to 300° C. by the steam jacket on the batch reactor (3).

The reaction components are generally added to the batch reactor (3) before the addition of the densified fluid, particularly the solid components. In the alternative, any liquid components can be pumped into the batch reactor after the addition of the densified fluid. After the addition of all components is completed and the batch reactor is at the desired pressure and temperature, the reaction mixture is stirred for a reaction time ranging from 5 minutes to 48 hours.

One of the advantages of this modification process using densified fluids as the solvent medium is that the fluid-soluble unreacted reagents and byproducts can be easily separated from the modified polysaccharide, since the polysaccharide is insoluble in the fluid. At the end of the synthesis process, the components of the high pressure reaction mixture are passed through the Filter (4) to remove the solid components which included the modified polysaccharide. If necessary, this solid material can also be washed with excess densified fluid to remove any excess soluble byproducts. The solids can optionally be washed with water in the Decanter (5) to remove any water soluble, but densified fluid insoluble byproducts and the aqueous slurry of modified polysaccharide is then dried optionally in a spray dryer.

The spent fluids and soluble byproducts are transferred through an Expansion valve, into a Separator vessel (6). In the flashdrum, pressures are reduced to between about 14.7 and about 1,000 psi and to a temperature of about 0° C. to about 200° C. Gaseous solvent is separated from the soluble byproducts or solvent entrainers and recycled back to the mixer vessel (1). The byproducts remaining in the separator vessel (6) are optionally disposed of or retreated in some way to form useful products.

The following examples will more fully illustrate and explain the embodiments of the present invention and should not be taken as limiting in any regard. All parts, percentages and proportions referred to herein are by weight unless otherwise indicated.

EXAMPLES

Example 1

A starch modification reaction in densified carbon dioxide was carried out in a 300 mL high pressure autoclave with varying amounts of carbon dioxide, at 60 to 140° C. for 1.0 to 3.0 hours. In each run, 7.5 g starch and the appropriate amount of modifier were used. For example, four equivalents of acetic anhydride per equivalent of starch monomer are typically used in these reactions, and the extra equivalent of anhydride was added to react with the 10 wt % water inherently present in the native starch. The type of modifier was varied to produce modified starches with different properties. The amount and type of catalyst were varied to increase the amount of modification of the starch. Equivalents of reagents will be reported per AGU or anhydroglucose unit. Each starch sample was analyzed by fourier transform near infrared spectroscopy (FTNIR) and/or a hydrolysis technique using sodium hydroxide in 1-butanol to determine the extent of esterification (DS). DS, or degree of substitution, is determined by the number of starch-OH groups on the starch monomer available for reactivity, therefore the DS range for unsubstituted to totally substituted starch materials will be 0 to 3. Gel permeation chromatography against dextran standards was also obtained on the HYLON® VII starch (a high amylose corn starch containing approximately 70% amylose, commercially available from National Starch and Chemical Company) to determine the molecular weight breakdown of the starch backbone during the modification reaction. Unreacted HYLON® VII starch has a molecular weight of 1.2 million by GPC. The molecular weight, as determined by GPC, of the modified samples were compared to that of unreacted HYLON VII®. Some samples were analyzed for molecular weight breakdown by a relative inherent viscosity technique using a Canon-Fenske Calibrated Viscometer and dimethylsulfoxide as the solvent. The process of determining inherent viscosity is known in the art, for example see *Starch: Chemistry and Technology*, Vol. 11, Whistler, and Paschall (1967) Academic Press, pp. 225–226.

The high pressure equipment used for these reactions is typical for use with densified carbon dioxide. Reactions were carried out in a 300 mL autoclave equipped with pressure gauge, rupture disk, furnace, magnedrive stirrer, in-line filters and thermocouple. A two stage gas compressor or an ISCO 260D digital syringe pump was used to pressurize the vessel. The autoclave was loaded with the reactants, sealed, filled to 830 psi of carbon dioxide, heated to the desired temperature and then pressurized to the reaction pressure. In the reactions in which the anhydride was "post-dosed", it was added with a second ISCO 260D digital syringe pump to the autoclave which had been pressurized to just below the desired pressure and heated to the desired reaction temperature. At the end of the reaction, the autoclave was flushed with fresh carbon dioxide through an extraction system to remove unreacted anhydride and acid byproduct and any soluble catalyst. A dry solid product was obtained.

Example 2

HYLON® VII starch was esterified in densified carbon dioxide with acetic anhydride and sodium acetate as the catalyst. The catalyst was added at 3.3 equiv/AGU, and 19 ml or 4.35 equiv/AGU acetic anhydride were added. The reaction was carried out according to Example 1 at 115° C. and 4000 psi for 2.5 hours. The recovered product had a DS of 2.47 by FTNIR, and a molecular weight of 244.4 k by GPC.

Example 3

HYLON® VII starch was esterified in densified carbon dioxide with acetic anhydride and sodium acetate as the catalyst. The catalyst was added at 3.3 equiv/AGU, and 19 ml or 4.35 equiv/AGU acetic anhydride were added. The reaction was carried out according to Example 1 at 115° C. and 4000 psi for 1.0 hour. The recovered product had a DS of 1.97 by FTNIR, and a molecular weight of 593.0 k by GPC.

Example 4

HYLON® VII starch was esterified in densified carbon dioxide with acetic anhydride and sodium acetate as the catalyst. The catalyst was added at 0.8 equiv/AGU, and 19 ml or 4.35 equiv/AGU acetic anhydride were added. The reaction was carried out according to Example 1 at 115° C. and 2500 psi for 2.5 hours. The recovered product had a DS of 1.11 by FTNIR, and a molecular weight of 500.5 k by GPC.

Example 5

HYLON® VII starch was esterified in densified carbon dioxide with acetic anhydride and sodium acetate as the catalyst. The catalyst was added at 0.8 equiv/AGU, and 38 ml or 8.70 equiv/AGU acetic anhydride were added. The reaction was carried out according to Example 1 at 115° C. and 2500 psi for 2.5 hours. The recovered product had a DS of 2.26 by FTNIR and a molecular weight of 367.5 k by GPC.

Example 6

HYLON® VII starch was esterified in densified carbon dioxide with acetic anhydride and sodium acetate as the catalyst. The catalyst was added at 3.3 equiv/AGU, and 19 ml or 4.35 equiv/AGU acetic anhydride were added. The reaction was carried out according to Example 1 at 90° C. and 4000 psi for 2.5 hours. The recovered product had a DS of 0.66 by FTNIR, and a molecular weight of 968.6 k by GPC.

Example 7

HYLON® VII starch was esterified in densified carbon dioxide with acetic anhydride and sodium acetate as the catalyst. The catalyst was added at 0.8 equiv/AGU, and 19 ml or 4.35 equiv/AGU acetic anhydride were added. The reaction was carried out according to Example 1 at 90° C. and 2500 psi for 2.5 hours. The recovered product had a DS of 0.08 by hydrolysis with sodium hydroxide in 1-butanol and a molecular weight of 667.3 k by GPC.

Example 8

HYLON® VII starch was esterified in densified carbon dioxide with acetic anhydride and sodium acetate as the catalyst. The catalyst was added at 0.2 equiv/AGU, and 19 ml or 4.35 equiv/AGU acetic anhydride were added. The reaction was carried out according to Example 1 at 140° C. and 4000 psi for 2.5 hours. The recovered product had a DS of 2.33 by FTNIR. The molecular weight of the product was determined to be 444.3 k by GPC.

Example 9

HYLON® VII starch was esterified in densified carbon dioxide with acetic anhydride and sodium acetate as the catalyst. An additional 10 wt % water was added to the reaction with the starch. The catalyst was added at 3.3 equiv/AGU, and 19 ml or 4.35 equiv/AGU acetic anhydride were added. The reaction was carried out according to Example 1 at 115° C. and 4000 psi for 2.5 hours. The recovered product had a DS of 1.26 by FTNIR, which was comparable to the result obtained without the addition of excess water, when a DS of 1.24 was obtained.

Example 10

Vacuum oven dried HYLON® VII starch was esterified in densified carbon dioxide with acetic anhydride and sodium acetate as the catalyst. The starch contained 2.5% water by Karl Fisher total water analysis. The catalyst was added at 3.3 equiv/AGU, and 19 ml or 4.35 equiv/AGU acetic anhydride were added. The reaction was carried out according to Example 1 at 115° C. and 4000 psi for 2.5 hours. The recovered product had a DS of 0.08 by FTNIR, indicating that removal of the water from the starch decreases the reactivity, since native HYLON® VII starch under the same conditions gave a product with DS 2.4.

Example 11

HYLON® VII starch was esterified in densified carbon dioxide with acetic anhydride and sodium acetate trihydrate as the catalyst. The catalyst was added at 0.8 equiv/AGU, and 30.2 ml or 6.91 equiv/AGU acetic anhydride were added. The reaction was carried out according to Example 1 at 115° C. and 4000 psi for 2.5 hours. The recovered product had a DS of 1.75 by FTNIR, and a molecular weight of 240.3 k by GPC.

Example 12

HYLON® VII starch was esterified in densified carbon dioxide with a mixture of acetic acid and acetic anhydride and sodium acetate as the catalyst. The catalyst was added at 0.8 equiv/AGU, and 19 ml or 4.35 equiv/AGU acetic anhydride and 19 ml or 7.24 equiv/AGU acetic acid were added. The reaction was carried out according to Example 1 at 115° C. and 4000 psi for 2.5 hours. The recovered product had a DS of 1.67 by FTNIR.

Example 13
Variation of DS of Starch Acetates with Decreasing Catalyst at Different Pressures

| Run # | Pressure (psi) | Catalyst Level (eq/AGU) | DS |
|---|---|---|---|
| 1 | 4000 | 0.2 | 2.4 |
| 2 | 4000 | 0.15 | 1.0 |
| 3 | 4000 | 0.05 | 0.2 |
| 4 | 2500 | 0.15 | 2.4 |
| 5 | 2500 | 0.1 | 1.6 |
| 6 | 1500 | 0.1 | 2.3 |
| 7 | 1500 | 0.05 | 1.2 |

Other conditions: Hylon VII corn starch, 4.35 equiv/AGU acetic anhydride, 140C, 2.5 hours reaction time The data in the table indicate that the degree of substitution of the starch can be controlled by the level of catalyst employed at a particular pressure. As the pressure decreases, higher DS can be obtained at lower levels of catalyst. Therefore along with temperature being an important variable for the type of product formed as shown in Examples 2–9, pressure also controls the D.S. of the final product. The ease of control of these variables in this process allows for a number of different desired starch acetates to be produced in densified fluids.

Example 14

Catalysts other than sodium acetate can be used for the reaction. HYLON® VII starch was esterified in densified carbon dioxide with acetic anhydride and sodium trifluoroacetate as the catalyst. The catalyst was added at 0.8 equiv/AGU, and 19 ml or 4.35 equiv/AGU acetic anhydride were added. The reaction was carried out according to Example 1 at 115° C. and 4000 psi for 2.5 hours. The recovered product had a DS of 2.22 by FTNIR, and a molecular weight of 389.5 k by GPC.

Example 15

HYLON® VII starch was esterified in densified carbon dioxide with acetic anhydride and potassium acetate as the catalyst. The catalyst was added at 0.78 equiv/AGU, and 19 ml or 4.35 equiv/AGU acetic anhydride were added. The reaction was carried out according to Example 1 at 90° C. and 4000 psi for 3 hours. The recovered product had a DS of 0.58 by hydrolysis with sodium hydroxide in 1-butanol.

Example 16

HYLON® VII starch was esterified in densified carbon dioxide with acetic anhydride and ammonium perfluoropolyether carboxylate as the catalyst. The catalyst was added at 0.1 equiv/AGU, and 19 ml or 4.35 equiv/AGU acetic anhydride were added. The reaction was carried out according to Example 1 at 90° C. and 4000 psi for 3 hours. The recovered product had a DS of 2.0 by analysis by FT NIR.

Example 17

Transition metal acetates can also catalyze the modification. HYLON® VII starch was esterified in densified carbon dioxide with acetic anhydride and scandium(III) trifluoroacetate as the catalyst. The catalyst was added at 0.025 equiv/AGU, and 19 ml or 4.35 equiv/AGU acetic anhydride were added. The reaction was carried out according to Example 1 at 90° C. and 4000 psi for 2.5 hours. The recovered product had a DS of 1.48 by FTNIR, and had a molecular weight of 33.7 k by GPC.

Example 18

HYLON® VII starch was esterified in densified carbon dioxide with acetic anhydride and scandium(III) trifluoroacetate as the catalyst. The catalyst was added at 0.0125 equiv/AGU, and 19 ml or 4.35 equiv/AGU acetic anhydride were added. The reaction was carried out according to Example 1 at 1 15° C and 4000 psi for 2.5 hours. The recovered product had a DS of 0.25 by FTNIR, and had a molecular weight of 331.5 k by GPC.

Example 19

The modification reaction can also be catalyzed by Lewis bases such as tertiary amines. HYLON® VII starch was esterified in densified carbon dioxide with acetic anhydride and triethylamine as the catalyst. The catalyst was added at 0.78 equiv/AGU, and 19 ml or 4.35 equiv/AGU acetic anhydride were added. The reaction was carried out according to Example 1 at 90° C. and 4000 psi for 2.5 hours. The recovered product had a DS of 0.27 by hydrolysis with sodium hydroxide in 1-butanol.

Example 20

HYLON® VII starch was esterified in densified carbon dioxide with acetic anhydride and N,N-dimethylaniline as the catalyst. The catalyst was added at 0.78 equiv/AGU, and 19 ml or 4.35 equiv/AGU acetic anhydride were added. The reaction was carried out according to Example 1 at 90° C. and 4000 psi for 2.5 hours. The recovered product had a DS of 0.28 by hydrolysis with sodium hydroxide in 1-butanol.

Example 21

HYLON® VII starch was esterified in densified carbon dioxide with acetic anhydride and di-2-pyridylketone as the catalyst. The catalyst was added at 0.78 equiv/AGU, and 19 ml or 4.35 equiv/AGU acetic anhydride were added. The reaction was carried out according to Example 1 at 90° C. and 4000 psi for 2.5 hours. The recovered product had a DS of 0.30 by hydrolysis with sodium hydroxide in 1-butanol.

Example 22

HYLON® VII starch was esterified in densified carbon dioxide with acetic anhydride and 5-dimethylamino-2-pentanone as the catalyst. The catalyst was added at 0.78 equiv/AGU, and 19 ml or 4.35 equiv/AGU acetic anhydride were added. The reaction was carried out according to Example 1 at 90° C. and 4000 psi for 2.5 hours. The recovered product had a DS of 0.19 by hydrolysis with sodium hydroxide in 1-butanol.

Example 23

HYLON® VII starch was esterified in densified carbon dioxide with acetic anhydride and dimethylaminoacetonitrile as the catalyst. The catalyst was added at 0.78 equiv/AGU, and 19 ml or 4.35 equiv/AGU acetic anhydride were added. The reaction was carried out according to Example 1 at 90° C. and 4000 psi for 2.5 hours. The recovered product had a DS of 0.18 by hydrolysis with sodium hydroxide in 1-butanol.

Example 24

HYLON® VII starch was esterified in densified carbon dioxide with acetic anhydride and 2-dimethylaminopyridine as the catalyst. The catalyst was added at 0.78 equiv/AGU, and 19 ml or 4.35 equiv/AGU acetic anhydride were added. The reaction was carried out according to Example 1 at 90° C. and 24000 psi for 2.5 hours. The recovered product had a DS of 0.29 by hydrolysis with sodium hydroxide in 1-butanol.

Example 25

HYLON® VII starch was esterified in densified carbon dioxide with acetic anhydride and 4-dimethylaminopyridine as the catalyst. The catalyst was added at 0.78 equiv/AGU, and 19 ml or 4.35 equiv/AGU acetic anhydride were added. The reaction was carried out according to Example 1 at 90° C. and 4000 psi for 2.5 hours. The recovered product had a DS of 0.58 by hydrolysis with sodium hydroxide in 1-butanol.

Example 26

HYLON® VII starch was esterified in densified carbon dioxide with acetic anhydride and 4-dimethylaminopyridine as the catalyst. The catalyst was added at 2.46 equiv/AGU, and 19 ml or 4.35 equiv/AGU acetic anhydride were added. The reaction was carried out according to Example 1 at 90° C. and 4000 psi for 2.5 hours. The recovered product had a DS of 0.98 by hydrolysis with sodium hydroxide in 1-butanol.

Example 27

Bases such as hydroxides can also effect catalysis of the modification reaction. HYLON® VII starch was esterified in densified carbon dioxide with acetic anhydride and lithium hydroxide as the catalyst. The catalyst was added at 0.78 equiv/AGU, and 19 ml or 4.35 equiv/AGU acetic anhydride were added. The reaction was carried out according to Example 1 at 90° C. and 4000 psi for 3 hours. The recovered product had a DS of 0.32 by hydrolysis with sodium hydroxide in 1-butanol.

Example 28

HYLON® VII starch was esterified in densified carbon dioxide with acetic anhydride and sodium hydroxide as the catalyst. The catalyst was added at 0.78 equiv/AGU, and 19 ml or 4.35 equiv/AGU acetic anhydride were added. The reaction was carried out according to Example 1 at 90° C. and 4000 psi for 3 hours. The recovered product had a DS of 0.30 by hydrolysis with sodium hydroxide in 1-butanol.

Example 29

HYLON® VII starch was esterified in densified carbon dioxide with acetic anhydride and sodium hydroxide as the catalyst. The catalyst was added at 3.3 equiv/AGU, and 19 ml or 4.35 equiv/AGU acetic anhydride were added. The reaction was carried out according to Example 1 at 90° C. and 4000 psi for 3 hours. The recovered product had a DS of 1.50 by hydrolysis with sodium hydroxide in 1-butanol.

Example 30

Modification and hydrolysis of the corn starch to a particular molecular weight can be carried out in densified carbon dioxide. HYLON® VII starch was esterified and hydrolyzed in supercritical carbon dioxide according to Example 1 at 90° C. with acetic anhydride and p-toluene sulfonic acid as the catalyst. The catalyst was added at 0.26 equiv/AGU, and 19 ml or 4.35 equiv/AGU acetic anhydride were added. The product was retrieved from the autoclave after one hour without flushing. The starch product had a DS of 3.0 by the hydrolysis technique, and it had an IV (relative inherent viscosity) measurement of 0.01. Unmodified HYLON® VII starch has an IV of 0.95, which indicated that virtually total hydrolysis of the esterified starch to oligomeric material had occurred.

Example 31

HYLON® VII starch was esterified and partially hydrolyzed in densified carbon dioxide according to Example 1 at 60° C. with acetic anhydride and p-toluene sulfonic acid as the catalyst. The catalyst was added at 0.26 equiv/AGU, and 19 ml or 4.35 equiv/AGU acetic anhydride were added. The starch product contained 20% of a material that had a DS of 3.0 by the hydrolysis technique, and it had an IV (relative inherent viscosity) measurement of 0.2. The product also contained 80% of a material that had a DS of 0.4 and an IV of 0.5. Unmodified starch has an IV of 0.95.

Example 32

Hydrolysis of the corn starch to a particular molecular weight can also be carried out independent of esterification or other modification. HYLON® VII starch was treated with 0.26 equiv/AGU para-toluene sulfonic acid (p-TSA) catalyst without any anhydride in densified carbon dioxide at 4000 psi and 90° C. for three hours. The isolated product had an IV of 0.03, indicating that the p-TSA can catalyze hydrolysis of the starch in supercritical carbon dioxide.

Example 33

Modification to produce esters other than acetates can also be conducted in densified carbon dioxide. HYLON® VII starch was esterified in densified carbon dioxide with propionic anhydride and sodium acetate as the catalyst. The catalyst was added at 3.3 equiv/AGU, and 25 ml or 4.21 equiv/AGU acetic anhydride were added. The reaction was carried out according to Example 1 at 115° C. and 4000 psi for 2.5 hours. The recovered product had a DS of 2.16 by the hydrolysis technique.

Example 34

More hydrophobic starch esters can also be synthesized in densified carbon dioxide. HYLON® VII starch was esterified in densified carbon dioxide with octenylsuccinic anhydride (OSA) and sodium acetate as the catalyst. The catalyst was added at 3.3 equiv/AGU, and 32.1 ml or 3.3 equiv/AGU of OSA were added. The reaction was carried out according to Example 1 at 115° C. and 4000 psi for 2.5 hours. The recovered product had a DS of 0.72 by the hydrolysis technique.

Example 35

The reactions of the invention are run using densified carbon dioxide. By contrast, the reaction described just below did not employ densified carbon dioxide and was not successful. More specifically, the reaction with OSA was attempted at atmospheric pressure in the solvent perchloroethylene and was not successful. The esterification of HYLON® VII starch was attempted in perchloroethylene with octenylsuccinic anhydride (OSA) and sodium acetate as the catalyst. The catalyst was added at 3.3 equiv/AGU, and 4.0 equiv/AGU of OSA were added after the suspension of starch and catalyst in perchloroethylene was at reflux. The reaction boiled for 2.5 hours and the product was recovered by filtration, followed by washing with water and refiltering to remove the catalyst. The recovered product was not esterified as shown by FTIR.

Example 36

A further starch ester can be made by reaction of HYLON® VII starch with octanoic anhydride. HYLON® VII starch was esterified in densified carbon dioxide with octanoic anhydride and sodium acetate as the catalyst. The catalyst was added at 3.3 equiv/AGU, and 41.3 ml or 3.3 equiv/AGU octanoic anhydride were added. The reaction was carried out according to Example 1 at 115° C. and 4000 psi for 2.5 hours. The recovered product had a DS of 0.35 by hydrolysis.

Example 37

HYLON® VII starch was esterified in perchloroethylene with octanoic anhydride and sodium acetate as the catalyst. The catalyst was added at 3.3 equiv/AGU, and 4.0 equiv/AGU octanoic anhydride were added after the suspension of starch and catalyst in perchloroethylene was at reflux. The reaction boiled for 2.5 hours and the product was recovered by filtration, followed by washing with water and refiltering to remove the catalyst. The recovered product had a DS of 0.07 by the hydrolysis technique.

Example 38

A further starch ester can be made by reaction of HYLON® VII starch with trifluoracetic anhydride. HYLON® VII starch was esterified in densified carbon dioxide with trifluoroacetic anhydride and sodium acetate as the catalyst. The catalyst was added at 3.3 equiv/AGU, and 30 9 or 4.0 equiv/AGU trifluoroacetic anhydride were added. The reaction was carried out according to Example 1 at 115° C. and 4000 psi for 2.5 hours. The recovered product had a DS of 1.67 by hydrolysis, and a molecular weight of 389 k by GPC.

Example 39

Starch base materials other than HYLON® VII starch can be utilized. Native corn starch was esterified in densified carbon dioxide with acetic anhydride and sodium acetate as the catalyst. The catalyst was added at 3.3 equiv/AGU, and 19 ml or 4.35 equiv/AGU acetic anhydride were added. The reaction was carried out according to Example 1 at 115° C. and 4000 psi for 2.5 hours. The recovered product had a DS of 1.25 by the hydrolysis technique.

Example 40

HYLON® V starch (a high amylose corn starch containing approximately 50% amylose, commercially available from National Starch and Chemical Company) was esterified in densified carbon dioxide with acetic anhydride and sodium acetate as the catalyst. The catalyst was added at 3.3 equiv/AGU, and 19 ml or 4.35 equiv/AGU acetic anhydride were added. The reaction was carried out according to Example 1 at 115° C. and 4000 psi for 2.5 hours. The recovered product had a DS of 1.81 by the hydrolysis technique.

Example 41

Waxy corn starch was esterified in densified carbon dioxide with acetic anhydride and sodium acetate as the catalyst. The catalyst was added at 3.3 equiv/AGU, and 19 ml or 4.35 equiv/AGU acetic anhydride were added.

The reaction was carried out according to Example 1 at 115° C. and 4000 psi for 2.5 hours. The recovered product had a DS of 1.71 by the hydrolysis technique.

Example 42

HYLON® VII starch is etherified in densified carbon dioxide with propylene oxide and sodium acetate as the catalyst. The catalyst is added at 1.0 equiv/AGU, and 8.9 ml or 3.3 equiv/AGU propylene oxide are added. The reaction is carried out according to Example 1 at 115° C. and 4000 psi for 2.5 hours.

Example 43

HYLON® VII starch is reacted with phenyl isocyanate in densified carbon dioxide with dibutyltindilaurate as the catalyst. The catalyst is added at 0.2 ml and 17.1 ml or 0.8 equiv/AGU phenyl isocyanate are added. The reaction is carried out according to Example 1 at 115° C. and 4000 psi for 2.5 hours.

Example 44

HYLON® VII starch is cross-linked with epichlorohydrin in densified carbon dioxide using 4-dimethylaminopyridine as the catalyst. The catalyst is added at 1.0 equiv/AGU, and 14.1 ml or 3.3 equiv/AGU epichlorohydrin are added. The reaction is was carried out according to Example 1 at 115° C. and 4000 psi for 2.5 hours.

Example 45

Previously modified starch base materials may also be used in the invention. For example, cold water soluble starch made by pressure cooking HYLON® VII starch was reacted with acetic anhydride and sodium acetate in carbon dioxide at 4000 psi and 115° C. for 2.5 hours. The catalyst was added at 3.3 equiv/AGU and 19 ml or 4.35 equiv/AGU acetic anhydride were added. The reaction was carried out according to Example 1. The recovered product had a DS of 1.7 by FTNIR.

Example 46

The reaction of Example 45 was repeated with a lower level of sodium acetate catalyst. The catalyst was added at 0.8 equiv/AGU, and the recovered product had a DS of 0.9 by FTNIR.

Example 47

Guar gum can also be used as a base material for the reaction of the invention. The reaction of Example 1 was repeated using 7.5 g guar gum, 0.2 equiv/AGU sodium acetate and 19 ml or 4.35 equiv/AGU acetic anhydride. The reaction was carried out at 4000 psi and 140° C. for 2.5 hours. The product had a DS of 2.3 by FTNIR.

Example 48

Maltodextrin is also particularly useful as a base material for the reaction of the invention. The reaction of Example 1 was repeated using 7.5 g maltodextrin with a molecular weight of 20 k, 0.8 equiv/AGU p-toluenesulfonic acid and 19 ml or 4.35 equiv/AGU acetic anhydride. The reaction was carried out at 4000 psi and 90° C. for 2.5 hours. The product had a DS of 3.0 by the hydrolysis method.

Example 49

Prehydrolyzed potato starch can also be used as a base material for the reaction of the invention. The reaction of Example 1 was repeated using 7.5 g prehydrolyzed potato starch, 0.2 equiv/AGU sodium acetate and 19 ml or 4.35 equiv/AGU acetic anhydride. The reaction was carried out at 3500 psi and 140° C. for 2.5 hours. The product had a DS of 0.14 by FTNIR.

Example 50

Maltodextrin can also be used as a base material for the reaction of the invention. The reaction of Example 1 was repeated using 7.5 g maltodextrin with a molecular weight of 20 k, 0.8 equiv/AGU sodium acetate and 16 g or 6.0 equiv/AGU propylene oxide. The reaction was carried out at 3500 psi and 135° C. for 2.5 hours. The product had a small amount of hydroxypropyl substitution by Fourier Transformer Nuclear Magnetic Resonance (FTNMR).

Example 51

Guar gum can also be used as a base material for the reaction of the invention. The reaction of Example 1 was repeated using 7.5 g guar gum, 0.8 equiv/AGU sodium acetate and 16 g or 6.0 equiv/AGU propylene oxide. The reaction was carried out at 3800 psi and 140° C. for 2.5 hours. The product had a small amount of hydroxypropyl substitution by FTNMR.

Example 52

Solvent entrainers can be utilized to aid in solubilization of the reagent in the supercritical carbon dioxide. Hylon® VII starch was esterified in densified carbon dioxide with octenylsuccinic anhydride (OSA) and sodium acetate as the catalyst. The catalyst was added at 0.8 equiv/AGU, and 32.1 ml or 3.3 equiv./AGU of OSA and 10 ml or 3 vol % of acetone as a solvent entrainer were added also. The reaction was carried out according to Example 1 at 140° C. and 4000 psi for 2.5 hours. The recovered product had a DS of 0.53 by the hydrolysis technique and a molecular weight of 260K daltons by GPC.

We claim:

1. A process for esterifying or etherifying a polysaccharide comprising the steps of:
   a) selecting at least one polysaccharide;
   b) selecting at least one reagent; and
   c) combining the polysaccharide and the reagent under densified fluid conditions using densified fluid and up to about 15% water by volume for a time effective to result in an esterified or an etherified polysaccharide.

2. The process according to claim 1, wherein the polysaccharide is selected from the group consisting of starches, gums, celluloses, dextrins, glycogen, hemicelluloses, dextrans, and inulins.

3. The process according to claim 2, wherein the polysaccharide is selected from the group consisting of high amylose corn starch, corn starch, waxy maize starch, potato starch, maltodextrins, and guar gum.

4. The process according to claim 1, wherein the reagent is an esterifying or etherifying reagent.

5. The process according to claim 1, wherein the reagent is selected from the group consisting of a cross-linking reagent and an isocyanate.

6. The process according to claim 4, wherein the reagent is selected from the group consisting of dicarboxylic acid anhydrides of the formula RC(O)OC(O)R wherein R is a $C_{1-30}$alkyl or a $C_{1-30}$alkenyl, alkylene oxides, phosphorous oxychloride and cyclic dicarboxylic acid anhydrides of the formula

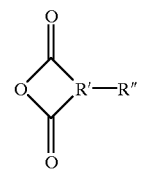

wherein R' is a dimethyl or trimethyl radical and R" is a $C_{1-30}$alkyl or a $C_{1-30}$alkenyl.

7. The process according to claim 6, wherein the reagent is selected from the group consisting of acetic anhydride, propylene oxide, phosphorous oxychloride, and octenyl succinic anhydride.

8. The process according to claim 1, wherein the densified fluid is densified carbon dioxide.

9. The process according to claim 1, wherein the densified fluid is supercritical carbon dioxide.

10. The process according to claim 1, further comprising combining a catalyst with the polysaccharide and the reagent.

11. The process according to claim 10, wherein the catalyst is selected from the group consisting of salts of organic acids, ammonium perfluoropolyether carboxylates, metal hydroxides, organic tertiary amines, Lewis bases, Lewis acids, and Bronsted acids.

12. The process according to claim 1, further comprising combining a solvent entrainer with the polysaccharide and the reagent.

13. The process according to claim 1, wherein the polysaccharide and the reagent are combined at a temperature of from about 0 to about 300° C.

14. The process according to claim 13, wherein the polysaccharide and the reagent are combined at a temperature of from about 25 to about 200° C.

15. An esterified or etherified polysaccharide prepared by a process comprising the steps of:
   a) selecting at least one polysaccharide;
   b) selecting at least one reagent; and
   c) combining the polysaccharide and the reagent under densified fluid conditions using densified fluid and up to about 15% water by volume for a time effective to result in an esterified or an etherified polysaccharide.

16. The polysaccharide according to claim 15, wherein the polysaccharide is selected from the group consisting of starches, gums, celluloses, dextrins, glycogen, hemicelluloses, dextrans, and inulins.

17. The polysaccharide according to claim 16, wherein the polysaccharide is selected from the group consisting of high amylose corn starch, corn starch, waxy maize starch, potato starch, maltodextrins, and guar gum.

18. The polysaccharide according to claim 15, wherein the reagent is an esterifying or etherifying reagent.

19. The polysaccharide according to claim 15, wherein the reagent is selected from the group consisting of a cross-linking reagent and an isocyanate.

20. The polysaccharide according to claim 18, wherein the reagent is selected from the group consisting of dicarboxylic acid anhydrides of the formula RC(O)OC(O)R wherein R is a $C_{1-30}$alkyl or a $C_{1-30}$alkenyl, alkylene oxides, phosphorous oxychloride and cyclic dicarboxylic acid anhydrides of the formula

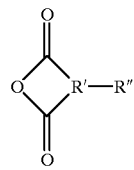

wherein R' is a dimethyl or trimethyl radical and R" is a $C_{1-30}$alkyl or a $C_{1-30}$alkenyl.

21. The polysaccharide according to claim 18, wherein the reagent is selected from the group consisting of acetic anhydride, propylene oxide, phosphorous oxychloride, and octenyl succinic anhydride.

22. The polysaccharide according to claim 15, wherein the densified fluid is densified carbon dioxide.

23. The polysaccharide according to claim 15, wherein the densified fluid is supercritical carbon dioxide.

24. The polysaccharide according to claim 15, further comprising combining a catalyst with the polysaccharide and the reagent.

25. The polysaccharide according to claim 24, wherein the catalyst is selected from the group consisting of salts of organic acids, ammonium perfluoropolyether carboxylates, metal hydroxides, organic tertiary amines, Lewis bases, Lewis acids, and Bronsted acids.

26. The polysaccharide according to claim 15, further comprising combining a solvent entrainer with the polysaccharide and the reagent.

27. The polysaccharide according to claim 15, wherein the polysaccharide and the reagent are combined at a temperature of from about 0 to about 300° C.

28. The polysaccharide according to claim 27, wherein the polysaccharide and the reagent are combined at a temperature of from about 25 to about 200° C.

29. The polysaccharide according to claim 15, wherein the polysaccharide has a degree of substitution higher than that which can be accomplished in a conventional, non-repetitive process.

* * * * *